UNITED STATES PATENT OFFICE.

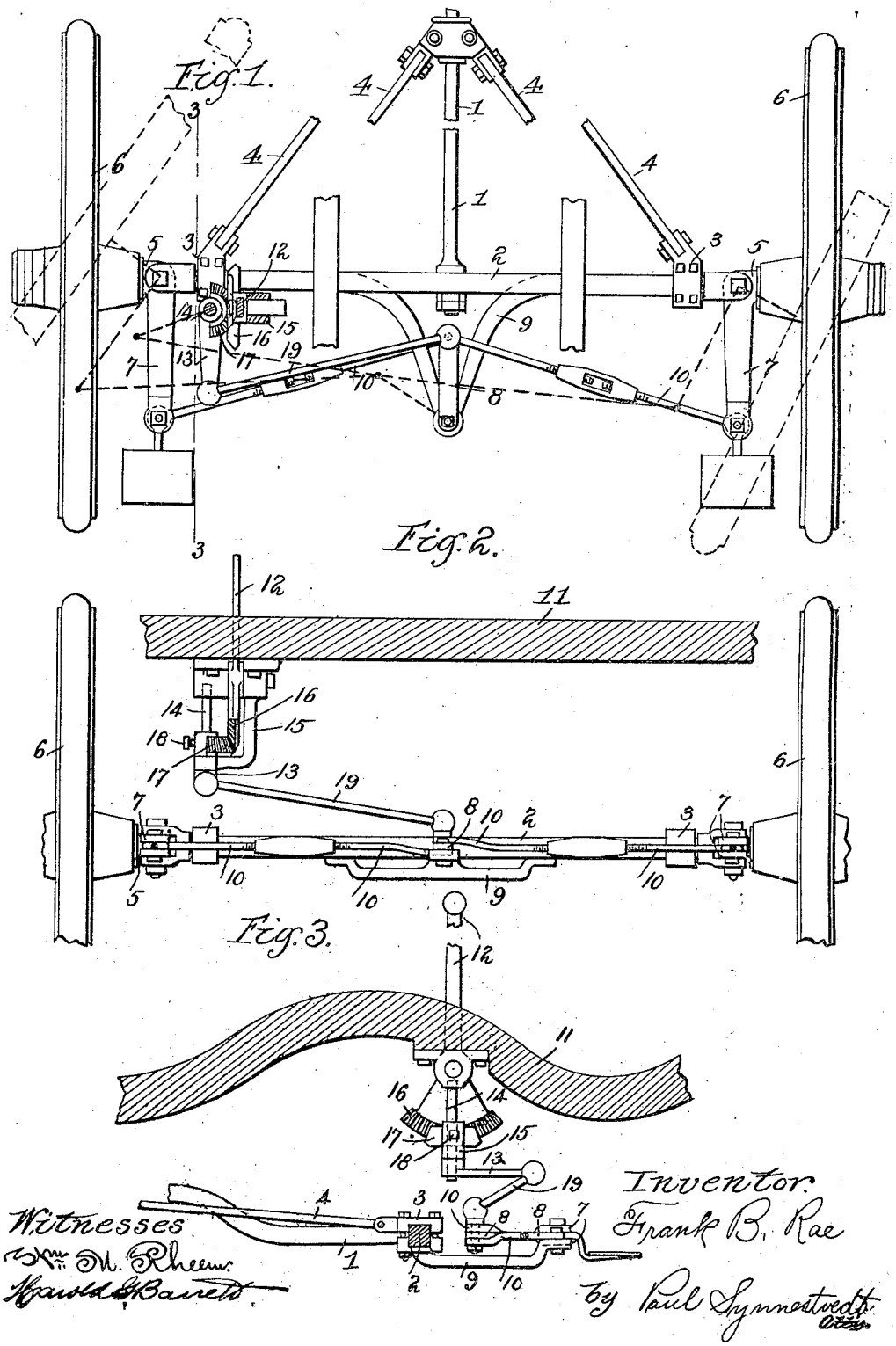

FRANK B. RAE, OF CHICAGO, ILLINOIS, ASSIGNOR TO THE AMERICAN ELECTROMOBILE COMPANY, OF EAST ORANGE, NEW JERSEY, A CORPORATION OF NEW JERSEY.

VEHICLE-STEERING MECHANISM.

No. 810,673.  Specification of Letters Patent.  Patented Jan. 23, 1906.

Application filed June 4, 1898. Renewed July 26, 1905. Serial No. 271,390.

*To all whom it may concern:*

Be it known that I, FRANK B. RAE, a citizen of the United States, and a resident of Chicago, county of Cook, and State of Illinois, have invented certain new and useful Improvements in Vehicle-Steering Mechanism, of which the following is a specification.

My invention relates to devices of the class mentioned, and while applicable to any form of vehicle is designed particularly for use on self-propelled vehicles or motocycles.

Among the objects of my invention are, first, to do away with the inconvenient horizontally-moving hand-lever ordinarily employed in mechanisms of this class and to substitute therefor a steering-lever mounted for movement in a vertical plane; second, to provide, in combination with such a steering-lever, devices and connections by which one of the steering-wheels will be moved more than the other, so that curves may be turned with greater facility; third, to so construct the steering mechanism and the axle that the steering-wheels may give freely in a vertical direction in going over irregularities on the surface of the ground without any torsional strain or racking action upon the main portion of the vehicle-frame; fourth, to accomplish the last-mentioned object without in anywise decreasing the strength or durability of the frame or its ability to resist blows encountered in striking obstacles along the road; fifth, to mount the steering or hand lever upon the body of the vehicle and the wheel-levers and connected parts upon the axle and to provide a connection between these two parts of the mechanism which will allow of the operation of the whole at all times without any interference or inconvenience arising through the swaying of the body of the vehicle upon the springs.

The above, as well as such other objects as may hereinafter appear, I attain by a construction which I have illustrated in preferred form in the accompanying drawings, in which—

Figure 1 is a plan view of a portion of a vehicle embodying my invention. Fig. 2 is a front view of the same, partly in section; and Fig. 3 is a side view further illustrating the arrangement and operation of the parts.

Referring now more particularly to Fig. 1, it will be seen that I have shown one end of a vehicle-frame reach-rod 1, upon which is pivotally mounted an axle 2, the pivot being so arranged that the axle is free to swing vertically, but not horizontally. Near the outer ends of the axle I have provided brackets 3, from which run a couple of brace-rods 4, leading to a point of attachment somewhere intermediate of the ends of the reach-rod 1, to which they may be attached either by pivotal or hinged connection or in any other convenient method which will permit the desired vertical movement of the axle. Pivotally attached to the outer ends of the axle I have provided a pair of wheel-shafts 5, upon which are mounted the steering-wheels 6, and rigidly or integrally secured to the wheel-shafts I arrange the wheel-levers 7, as shown. In order to secure a greater degree or angle of movement of one steering-wheel than the other, I provide a differentiating lever 8, one end of which is pivotally supported upon a bracket 9, attached to the axle, and the other end of which is connected by the adjustable rods 10 to the outer or free ends of the wheel-levers 7.

Upon the body 11 of the vehicle (see Figs. 2 and 3) I mount a hand steering-lever 12, which is arranged in such a manner as to be movable in a vertical plane preferably at the side of the driver. I also provide a horizontally-movable auxiliary lever 13, which is attached to a vertical shaft 14, journaled in the bracket 15. As an operative connection between this vertical shaft and the hand-lever 12 I provide the gears 16 and 17, one of which, 16, is fixed to the lower end of the lever 12 and the other, 17, secured by a set-screw 18 to the vertical shaft 14.

Between the outer ends of the auxiliary lever 13 and the differentiating lever 8 I provide a floating rod 19, forming a connection by means of which the movement of the auxiliary lever 13 is transmitted to the rods 10 and the wheel-levers 7. In order to secure a free movement of all the parts, the rod 19 is preferably made with a ball-and-socket joint at each end of the same.

The operation of my device is as follows: The wheels and levers being in the position shown in full lines, the hand-lever 12 will also be in the middle position. If the lever 12 be now moved forward or backward the shaft 14 will be rotated, the auxiliary lever 13 swung around, and the differentiating lever 8 also turned by means of the floating rod 19. The rods 10, forming, as they do, an angle with both the levers 7 and 8, one of said rods will approach a position where it acts to greater advantage, while the other of the rods will be constantly approaching a position where it acts to less advantage. In other words, the movement of the lever 7, affected through the movement of the lever 8 by means of the connecting-rods 10, varies as the angularity between the levers and the rods changes. The nearer the rod comes to forming a right angle with the two levers the greater will be the degree of movement transmitted, whereas the more acute the angle formed the less will be the amount of movement of the rod 10 and the lever 7 for the given amount of movement of the lever 8.

Having thus described my invention, what I claim as new, and desire to secure by Letters Patent, is—

1. A vehicle-steering mechanism comprising a vehicle-frame reach-rod, an axle mounted at its center upon said rod and having its ends free to move vertically but not horizontally, brace-rods connecting the ends of the axle with said reach-rod, a pair of wheel-shafts pivotally attached to the axle near the ends thereof, a pair of wheels mounted upon said wheel-shafts, wheel-levers integrally connected with said wheel-shafts, a differentiating lever having pivotal connection with said axle, connections between the outer ends of said wheel-levers and of said differentiating lever, a hand-lever mounted for movement in a vertical plane, an auxiliary lever mounted upon a vertical pivot, connections between said hand-lever and said auxiliary lever, and a floating rod connecting said auxiliary lever and said differentiating lever.

2. A vehicle-steering mechanism comprising a vehicle-frame reach-rod, an axle mounted at its center upon said rod and having its ends free to move vertically but not horizontally, brace-rods connecting the ends of the axle with said reach-rod, a pair of wheel-shafts pivotally attached to the axle near the ends thereof, a pair of wheels mounted upon said wheel-shafts, wheel-levers integrally connected with said wheel-shafts, a differentiating lever having pivotal connection with said axle, connections between the outer ends of said wheel-levers and of said differentiating lever, a hand-lever mounted for movement in a vertical plane, an auxiliary lever mounted upon a vertical pivot, gears forming connections between said hand-lever and said auxiliary lever, and a floating rod having ball-and-socket connection with said auxiliary lever and said differentiating lever.

FRANK B. RAE.

Witnesses:
PAUL SYNNESTVEDT,
HESTER B. BAIRD.